(12) United States Patent
Kashyap

(10) Patent No.: US 7,016,299 B2
(45) Date of Patent: Mar. 21, 2006

(54) NETWORK NODE FAILOVER USING PATH REROUTING BY MANAGER COMPONENT OR SWITCH PORT REMAPPING

(75) Inventor: Vivek Kashyap, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 834 days.

(21) Appl. No.: 09/917,314

(22) Filed: Jul. 27, 2001

(65) Prior Publication Data
US 2003/0021223 A1 Jan. 30, 2003

(51) Int. Cl.
H04L 12/26 (2006.01)
G06F 11/00 (2006.01)

(52) U.S. Cl. ............... 370/218; 370/228; 370/400; 709/238

(58) Field of Classification Search ............... 370/216, 370/217, 225, 389, 392, 400, 401, 227, 388, 370/218, 228; 709/213, 250, 251, 222, 239; 714/3, 4; 711/111
See application file for complete search history.

(56) References Cited

U.S. PATENT DOCUMENTS

| | | | |
|---|---|---|---|
| 6,308,282 B1 * | 10/2001 | Huang et al. ............... 714/4 |
| 6,421,711 B1 * | 7/2002 | Blumenau et al. .......... 709/213 |
| 6,594,261 B1 * | 7/2003 | Boura et al. ................ 370/389 |
| 6,618,371 B1 * | 9/2003 | Cao ........................... 370/388 |
| 6,687,758 B1 * | 2/2004 | Craft et al. ................ 709/250 |
| 6,694,361 B1 * | 2/2004 | Shah et al. ................ 709/222 |
| 6,704,278 B1 * | 3/2004 | Albert et al. ............... 370/216 |
| 6,715,098 B1 * | 3/2004 | Chen et al. .................... 714/3 |
| 6,724,759 B1 * | 4/2004 | Chang et al. ............... 370/389 |
| 6,757,242 B1 * | 6/2004 | Wang et al. ................ 370/216 |
| 6,766,412 B1 * | 7/2004 | Bolt ........................... 711/111 |
| 6,888,792 B1 * | 5/2005 | Gronke ...................... 370/227 |
| 6,944,786 B1 * | 9/2005 | Kashyap ........................ 714/4 |
| 2003/0097481 A1 * | 5/2003 | Richter ...................... 709/251 |

* cited by examiner

Primary Examiner—Alpus H. Hsu
(74) Attorney, Agent, or Firm—Bryan Butler

(57) ABSTRACT

The failover of network nodes by path rerouting or port remapping is disclosed. A system may include a manager component, a first switch, and/or a second switch. The component specifies destination address alternate routes. Upon first node failure, the component selects one of these routes to route the address to a second node. The first switch has a port for a third and a fourth node. Upon third node failure, the first switch remaps a destination address from the port for the third node to that for the fourth node. The second switch has an input port for a fifth and a sixth node, and a visible output port and hidden output ports to receive an expanded port range. Upon fifth node failure, the second switch uses the range to remap a destination address from the input port for the fifth node to that for the sixth node.

13 Claims, 13 Drawing Sheets

NETWORK NODE FAILOVER USING PATH REROUTING BY MANAGER COMPONENT OR SWITCH PORT REMAPPING

BACKGROUND OF THE INVENTION

1. Technical Field

This invention relates generally to networks, such as Infiniband networks, and more particularly to failover of nodes within such networks.

2. Description of the Prior Art

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. Therefore, new types of I/O networks have been proposed.

One new type of I/O network is known and referred to as the InfiniBand network. The InfiniBand network replaces the PCI or other bus currently found in computers with a packet-switched network, complete with one or more routers. A host channel adapter (HCA) couples the processor to a subnet, whereas target channel adapters (TCAs) couple the peripherals to the subnet. The subnet includes at least one switch, and links that connect the HCA and the TCAs to the switches. For example, a simple InfiniBand network may have one switch, to which the HCA and the TCAs connect through links. Topologies that are more complex are also possible and contemplated.

Each end node of an Infiniband network contains one or more channel adapters (CAs) and each CA contains one or more ports. Each port has a local identifier (LID) assigned by a local subnet manager (SM). Within the subnet, LIDs are unique. Switches use the LIDs to route packets within the subnet. Each packet of data contains a source LID (SLID) that identifies the port that injected the packet into the subnet and a destination LID (DLID) that identifies the port where the Infiniband fabric, or network, is to deliver the packet.

The Infiniband network methodology provides for multiple virtual ports within a physical port by defining a LID mask count (LMC). The LMC specifies the number of least significant bits of the LID that a physical port masks, or ignores, when validating that a packet DLID matches its assigned LID. Switches do not ignore these bits, however. The SM can therefore program different paths through the Infiniband fabric based on the least significant bits. The port thus appears to be $2^{LMC}$ ports for the purpose of routing across the fabric.

For critical applications needing round-the-clock availability without failure, failover of individual applications and thus communication endpoints, or end nodes, is usually required. Communication endpoints in the context of an Infiniband network are associated with CA ports. The applications use the endpoints to communicate over the Infiniband network, such as with other applications and so on. Transparent failover of an endpoint can mean that another endpoint takes over the responsibilities of the failed endpoint, in a manner that does not disrupt communications within network itself.

Transparent failover of endpoints and other nodes within an Infiniband network, however, is difficult to achieve because of how the endpoints are addressed. Failover requires that the LID be reassigned to a new port that is taking over for the failed port. However, the new port usually already has a LID assigned to it. Therefore, the only way an additional LID can be assigned is to expand the LMC range on the port, and then to ensure that the new LID falls within that range.

Expanding LMC ranges on ports is difficult in practice, however, and requires sometimes significant overhead to ensure that takeover ports can have the LIDs of failed ports assigned to them. LID failover is therefore viewed as a problem and a barrier to the successful rollout of Infiniband networks where transparent failover is required. For these reasons, as well as other reasons, there is a need for the present invention.

SUMMARY OF THE INVENTION

The invention relates to failover of nodes within networks by path rerouting or port remapping. A system of the invention includes at least one of a manager component of a network, a first switch of the network, and a second switch of the network. The manager component has programmed therein alternate routes for a destination address. Upon failure of a first node of the network to which the destination address is initially routed, the manager component selects one of the alternate routes to route the destination address to a second node of the network.

The first switch has a port for each of a third node and a fourth node of the network. Upon failure of the third node, the first switch remaps a destination address initially mapped to the port for the third node to the port for the fourth node. The second switch has an input port for each of a fifth node and a sixth node of the network. The second switch also has a visible output port and one or more hidden output ports, so that it receives an expanded port range from an assigning manager component. Upon failure of the fifth node, the second switch uses the expanded port range to remap a destination address initially mapped to the input port for the fifth node to the input port for the sixth node.

A method of the invention includes routing a destination address over an initial path to a first node connected to a first port on a switch. The destination address is initially mapped to the first port on the switch. Upon failure of the first node, one of two actions is performed for a second node to failover for the first node. First, the destination address may be routed to the second node over an alternate path selected by the manager component. Second, the destination address may be remapped from the first port on the switch to a second port on the switch connected to the second node. In one embodiment, this is accomplished by the switch using an expanded port range initially received from an assigning manager component due to the switch having at least one hidden output ports in addition to a visible output port.

An article of manufacture of the invention includes a computer-readable medium and means in the medium. The means is for performing one of two actions for a failover node to take over a destination address from a failed node. First, the means may reroute the destination address to over an alternate path to the failover node from over an original path to the failed node. Second, the means may remap the destination address from a first port connected to the failed node to a second port connected to the failover node. In one embodiment, this is accomplished by the means using an expanded port range initially received from an assigning manager component due to the switch having at least one hidden output ports in addition to a visible output port.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
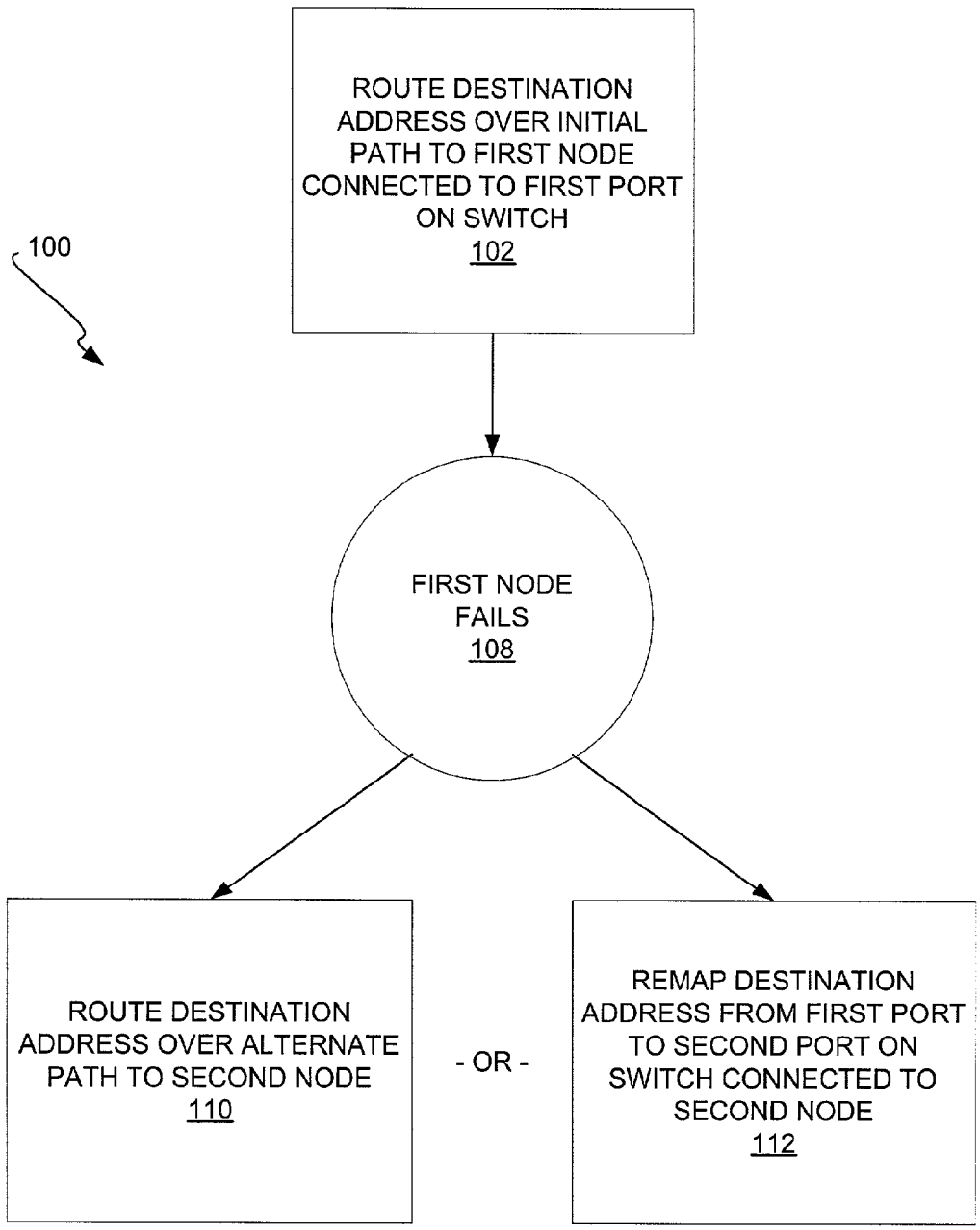
FIG. 1 is flowchart of a method according to a preferred embodiment of the invention, and is suggested for printing on the first page of the issued patent.

FIG. 1 shows a method 100 according to a preferred embodiment of the invention. A destination address is initially routed over an initial path to a first node of a network connected to a first port on a switch (102). The destination address is initially mapped to the first port on the switch. Communication to the destination address is thus received by the first node in either or both of two ways. First, the initial path leads to the first node as programmed by a manager component. Second, the port on the switch is connected to the first node, so that the switch properly routes communication to the first node. The first node then fails (108), so that either the action of 110 or 112 is performed for a second node of the network to failover for the first node.

First, the destination address may be routed over an alternate path to the second node previously programmed in and then selected by the manager component (110). For instance, the manager component may have a number of alternate routes specified for the destination address, due to initial programming of the manager component. When the first node fails, a new path for the destination address is selected from one of the alternate paths, where the new path leads to the second node. In this way, the second node fails over for the first node. More specifically, the manager component reprograms the switches along the paths so that communication to the destination address reaches the second node over the alternate path, where initially the switches were programmed so that such communication reached the first node over the initial path.

Second, the destination address may be remapped from the first port on the switch to a second port on the switch connected to the second node. When the first node fails, the switch remaps the destination address to its second port connected to the second node, so that communication to the destination address is received by the second node instead of by the first node. The switch may have an expanded port range to allow such remapping due to it having only one visible port, such that one or more other ports are hidden to a manager component that assigns the switch the expanded port range. In this way, the second node fails over for the first node.

The network is preferably an Infiniband network. The first and the second nodes may be hosts on such a network having channel adapters (CAs) and ports. The manager component may be a subnet manager (SM) of an Infiniband subnet. Means in a computer-readable medium of an article of manufacture may perform the functionality or actions of 110 and 112 as has been described. The means may be a recordable data storage medium, a modulated carrier signal, or another type of medium or signal.

TECHNICAL BACKGROUND

Figure 2:
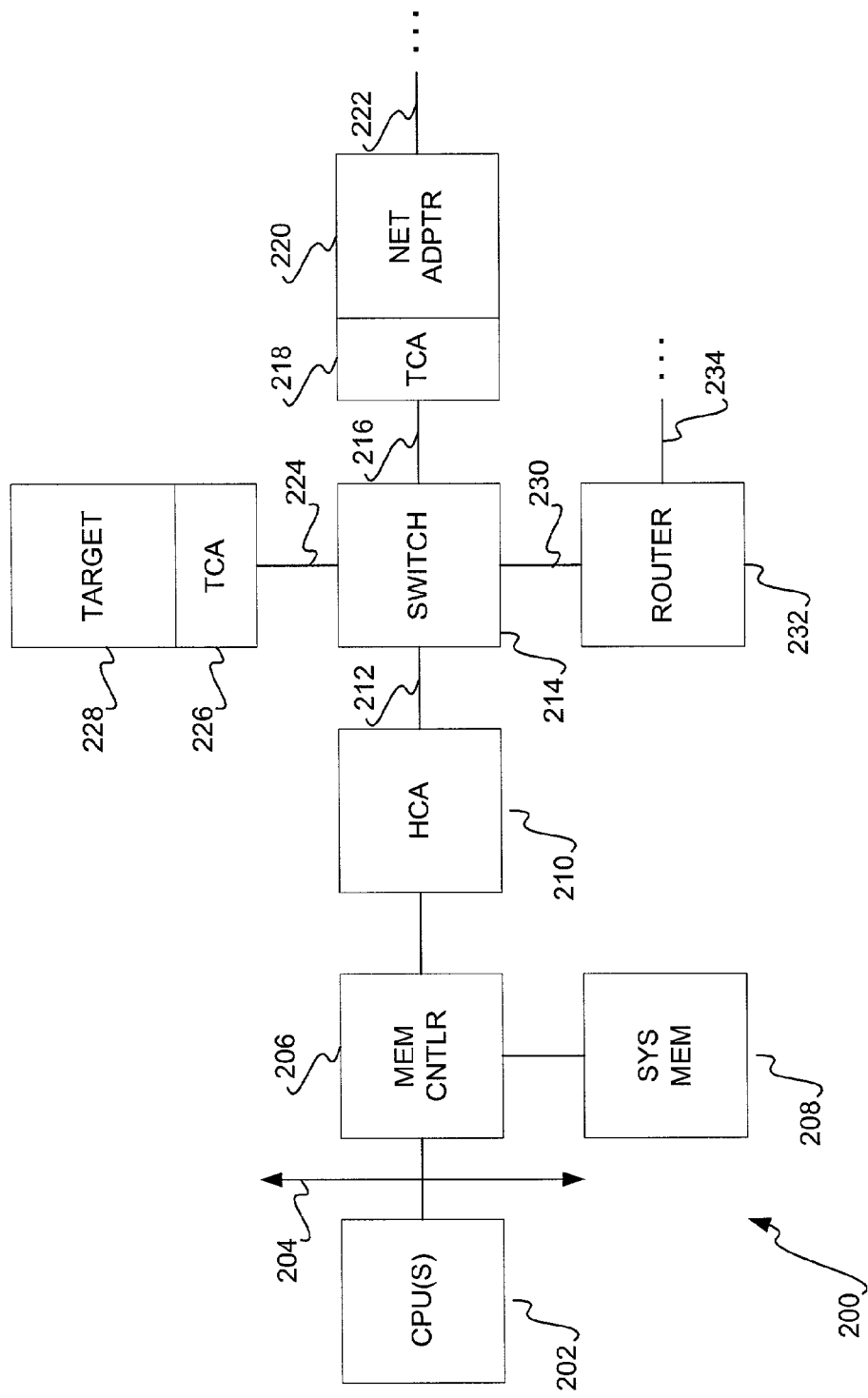
FIG. 2 is a diagram of an InfiniBand network in conjunction with which embodiments of the invention may be implemented.

FIG. 2 shows an example InfiniBand network architecture 200 in conjunction with which embodiments of the invention may be implemented. An InfiniBand network is one type of network. The invention can be implemented with other types of networks, too. Processor(s) 202 are coupled to a host interconnect 204, to which a memory controller 206 is also coupled. The memory controller 206 manages system memory 208. The memory controller 206 is also connected to a host channel adapter (HCA) 210. The HCA 210 allows the processor and memory sub-system, which encompasses the processor(s) 202, the host interconnect 204, the memory controller 206, and the system memory 208, to communicate over the InfiniBand network.

The InfiniBand network in FIG. 2 is particularly what is referred to as a subnet 236, where the subnet 236 encompasses InfiniBand links 212, 216, 224, and 230, and an InfiniBand switch 214. There may be more than one InfiniBand switch, but only the switch 214 is shown in FIG. 2. The links 212, 216, 224, and 230 enable the HCA and the target channel adapters (TCAs) 218 and 226 to communicate with one another, and also enables the InfiniBand network to communicate with other InfiniBand networks, through the router 232. Specifically, the link 212 connects the HCA 210 to the switch 214. The links 216 and 224 connect the TCAs 218 and 226, respectively, to the switch 224. The link 230 connects the router 232 to the switch 214.

The TCA 218 is the target channel adapter for a specific peripheral, in this case an Ethernet network adapter 220. A TCA may house multiple peripherals, such as multiple network adapters, SCSI adapters, and so on. The TCA 218 enables the network adapter 220 to send and receive data over the InfiniBand network. The adapter 220 itself allows for communication over a communication network, particularly an Ethernet network, as indicated by line 222. Other communication networks are also amenable to the invention. The TCA 226 is the target channel adapter for another peripheral, the target peripheral 228, which is not particularly specified in FIG. 2. The router 232 allows the InfiniBand network of FIG. 2 to connect with other InfiniBand networks, where the line 234 indicates this connection.

InfiniBand networks are packet switching input/output (I/O) networks. Thus, the processor(s) 202, through the interconnect 204 and the memory controller 206, sends and receives data packets through the HCA 210. Similarly, the target peripheral 228 and the network adapter 220 send and receive data packets through the TCAs 226 and 218, respectively. Data packets may also be sent and received over the router 232, which connects the switch 214 to other InfiniBand networks. The links 212, 216, 224, and 230 may have varying capacity, depending on the bandwidth needed for the particular HCA, TCA, and so on, that they connect to the switch 214.

InfiniBand networks provide for communication between TCAs and HCAs in a variety of different manners, which are briefly described here for summary purposes only. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

Furthermore, InfiniBand networks allow for a number of different transport services, including reliable and unreliable connections, reliable and unreliable datagrams, and raw packet support. In reliable connections and datagrams, acknowledgments and packet sequence numbers for guaranteed packet ordering are generated. Duplicate packets are rejected, and missing packets are detected. In unreliable connections and datagrams, acknowledgments are not generated, and packet ordering is not guaranteed. Duplicate packets may not be rejected, and missing packets may not be detected.

Figure 3:
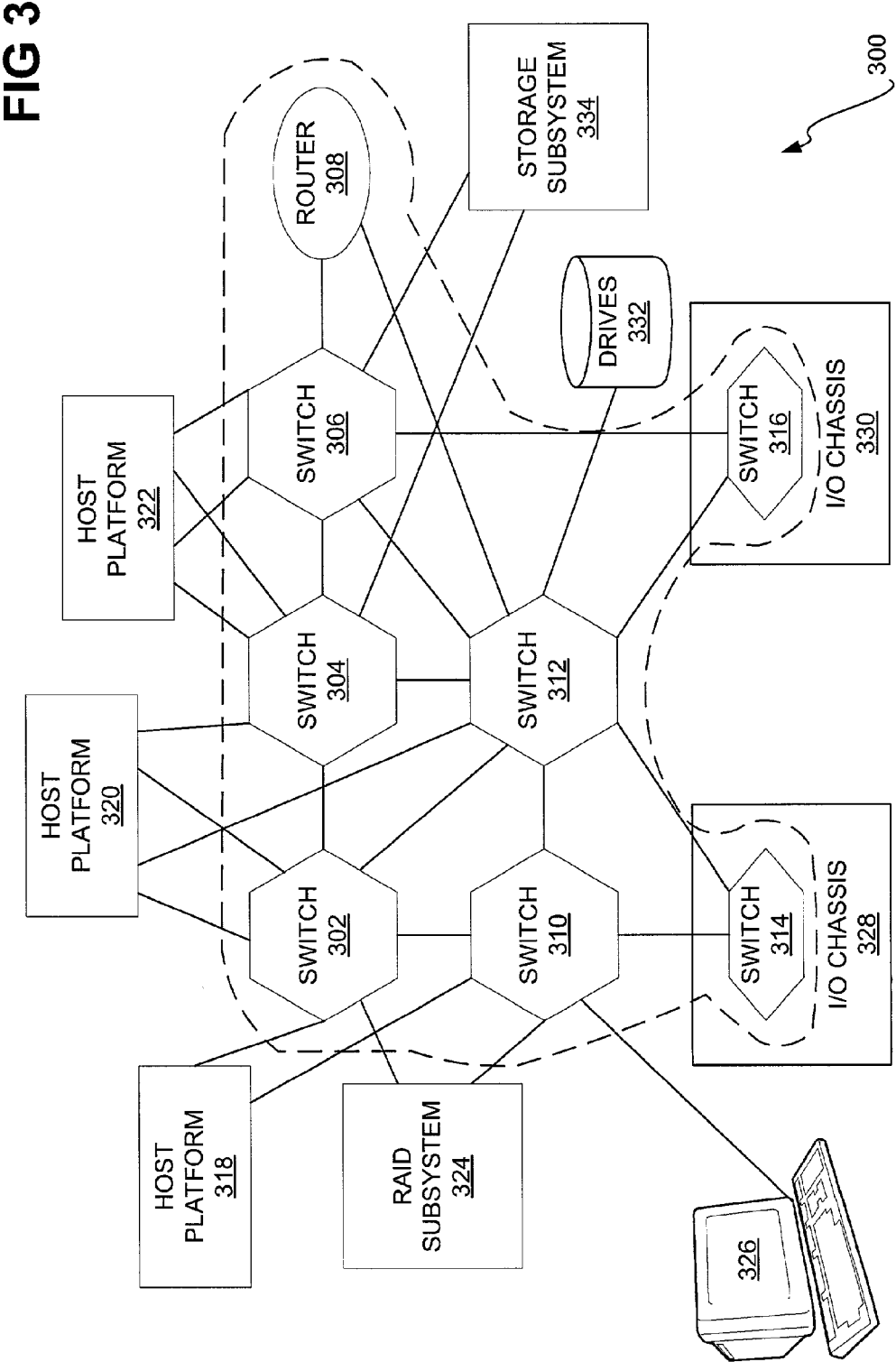
FIG. 3 is a diagram of an example Infiniband system area network (SAN) in conjunction with which embodiments of the invention may be implemented.

An Infiniband network can also be used to define a system area network (SAN) for connecting multiple independent processor platforms, or host processor nodes, I/O platforms, and I/O devices. FIG. 3 shows an example SAN 300 in conjunction with which embodiments of the invention may be implemented. The SAN 300 is a communication and management infrastructure supporting both I/O and interprocessor communications (IPC) for one or more computer systems. An Infiniband system can range from a small server to a massively parallel supercomputer installation. Furthermore, the Internet Protocol (IP)-friendly nature of Infiniband networks allows bridging to the Internet, an intranet, or connection to remote computer systems.

The SAN 300 has a switched communications fabric 301, or subnet, that allows many devices to concurrently communicate with high bandwidth and low latency in a protected, remotely managed environment. An end node can communicate over multiple Infiniband ports and can utilize multiple paths through the fabric 301. The multiplicity of ports and paths through the network 300 are exploited for both fault tolerance and increased data transfer bandwidth. Infiniband hardware off-loads much of the processor and I/O communications operation. This allows multiple concurrent communications without the traditional overhead associated with communicating protocols.

The fabric 301 specifically includes a number of switches 302, 304, 306, 310, and 312, and a router 308 that allows the fabric 301 to be linked with other Infiniband subnets, wide-area networks (WANs), local-area networks (LANs), and hosts, as indicated by the arrows 303. The fabric 301 allows for a number of hosts 318, 320, and 322 to communicate with each other, as well as with different subsystems, management consoles, drives, and I/O chasses. These different subsystems, management consoles, drives, and I/O chasses are indicated in FIG. 3 as the redundant array of information disks (RAID) subsystem 324, the management console 326, the I/O chasses 328 and 330, the drives 332, and the storage subsystem 334.

Figure 4:
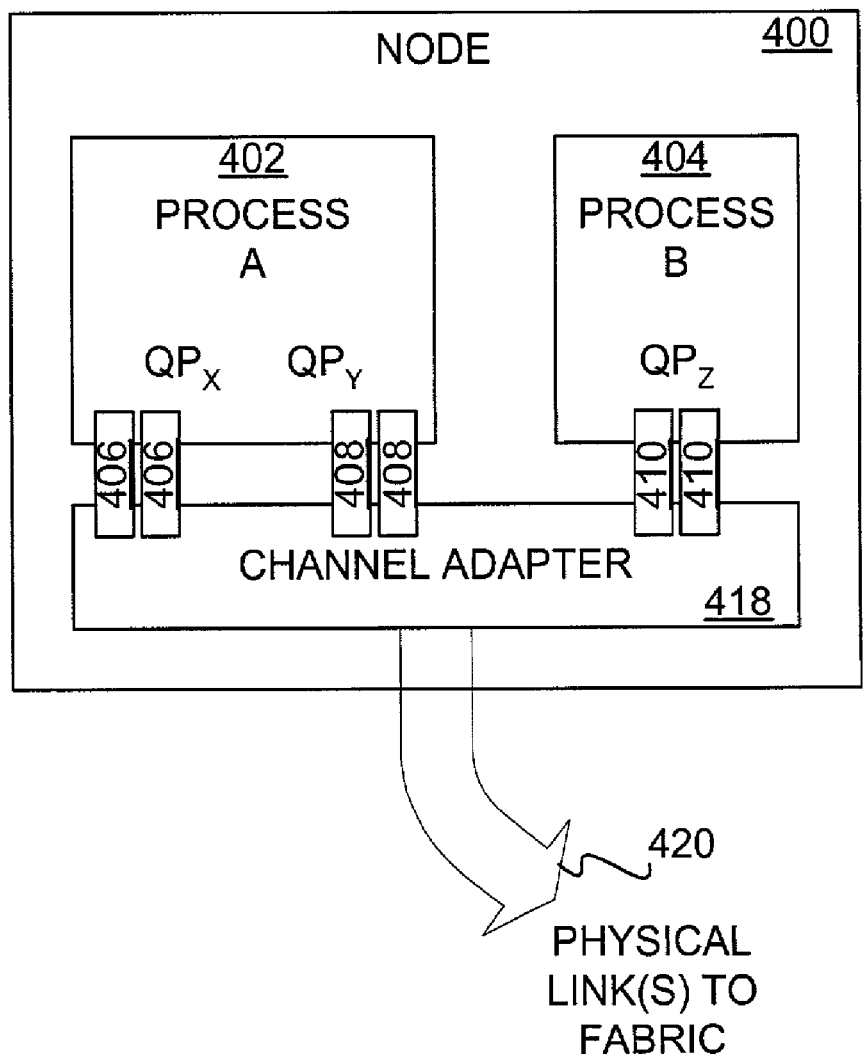
FIG. 4 is a diagram of a communication interface of an example end node of an Infiniband network.

FIG. 4 shows the communication interface of an example end node 400 of an Infiniband network. The end node may be one of the hosts 318, 320, and 322 of FIG. 3, for instance. The end node 400 has running thereon processes 402 and 404. Each process may have associated therewith one or more queue pairs (QPs), where each QP communicates with the channel adapter (CA) 418 of the node 400 to link to the Infiniband fabric, as indicated by the arrow 420. For example, the process 402 specifically has QPs 406 and 408, whereas the process 404 has a QP 410.

QPs are defined between an HCA and a TCA. Each end of a link has a queue of messages to be delivered to the other. A QP includes a send work queue and a receive work queue that are paired together. In general, the send work queue holds instructions that cause data to be transferred between the client's memory and another process's memory, and the receive work queue holds instructions about where to place data that is received from another process.

The QP represents the virtual communication interface with an Infiniband client process and provides a virtual communication port for the client. A CA may supply up to $2^{24}$ QPs and the operation on each QP is independent from the others. The client creates a virtual communication port by allocating a QP. The client initiates any communication establishment necessary to bind the QP with another QP and configures the QP context with certain information such as destination address, service level, negotiated operating limits, and so on.

Figure 5:
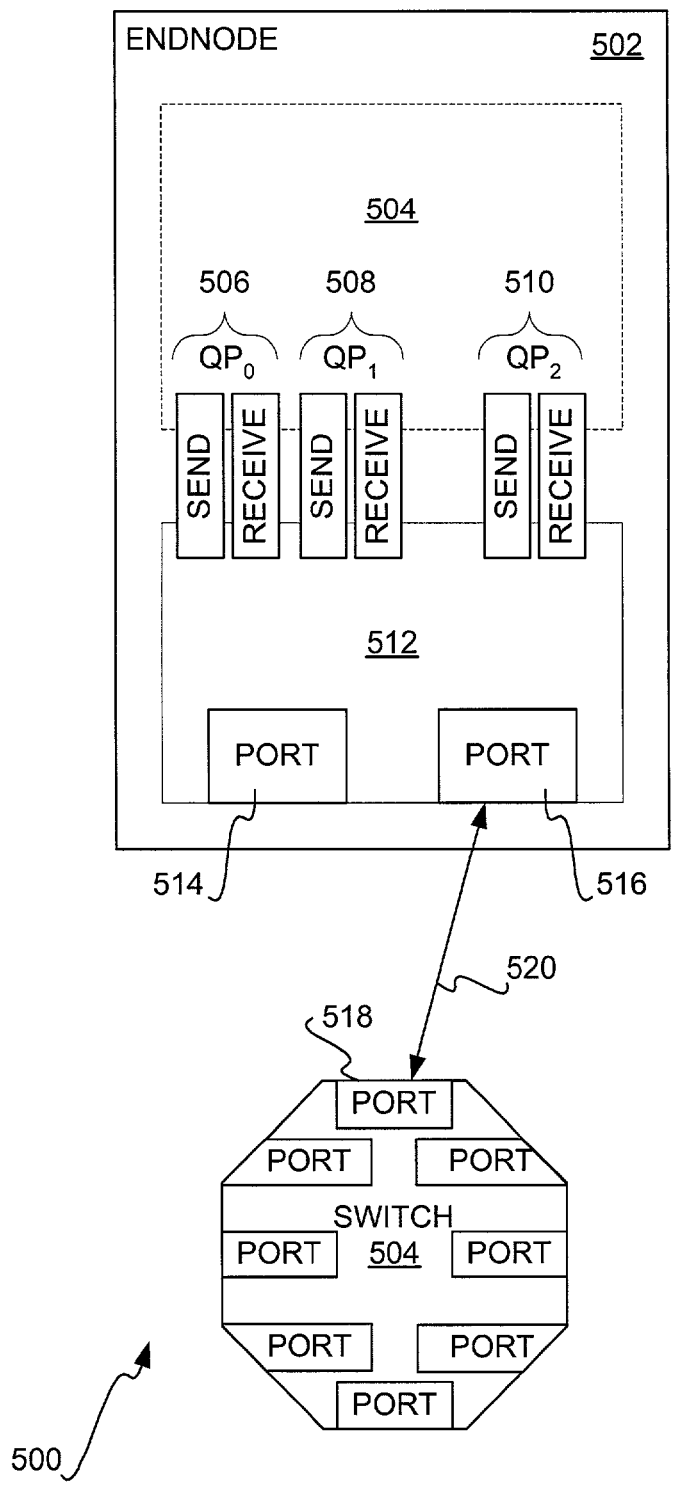
FIGS. 5 and 6 are diagrams of Infiniband networks showing how Infiniband addressing occurs.
Figure 6:
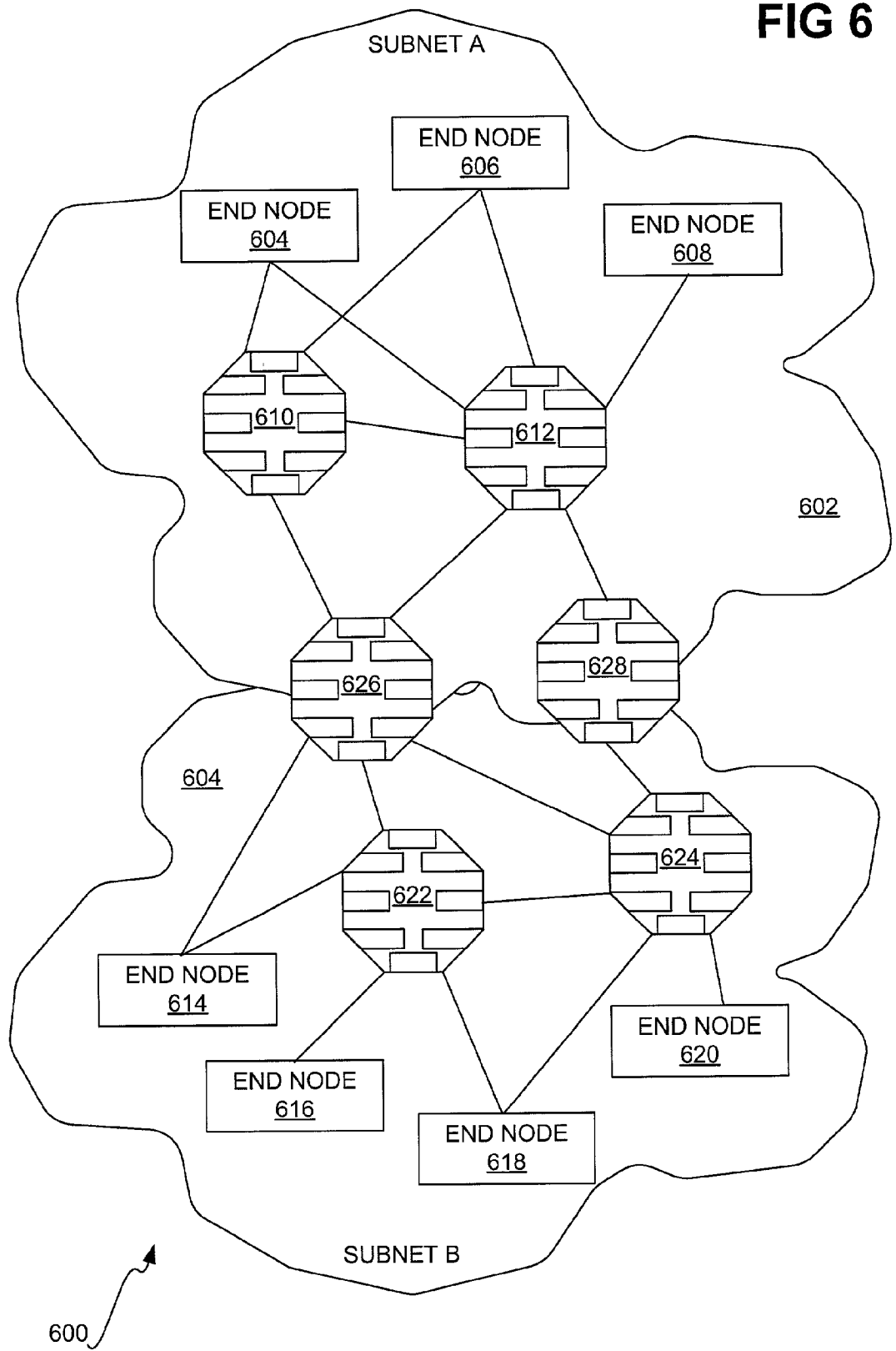

FIGS. 5 and 6 show how addressing occurs within an Infiniband network. In FIG. 5, a simple Infiniband network 500 is shown that includes one end node 502 and a switch 504. The end node 502 has running thereon processes 504 having associated QPs 506, 508, and 510. The end node 502 also includes one or more CAs, such as the CA 512. The CA 512 includes one or more communication ports, such as the ports 514 and 516. Each of the QPs 506, 508, and 510 has a queue pair number (QPN) assigned by the CA 512 that uniquely identifies the QP within the CA 512. Data packets other than raw datagrams contain the QPN of the destination work queue. When the CA 512 receives a packet, it uses the context of the destination QPN to process the packet appropriately.

A local subnet manager (SM) assigns each port a local identifier (LID. An SM is a management component attached to a subnet that is responsible for configuring and managing switches, routers, and CAs. An SM can be embedded with other devices, such as a CA or a switch. For instance, the SM may be embedded within the CA 512 of the end node 502. As another example, the SM may be embedded within the switch 504.

Within an Infiniband subnet, LIDs are unique. Switches, such as the switch 504, use the LID to route packets within the subnet. Each packet contains a source LID (SLID) that identifies the port that injected the packet into the subnet and a destination LID (DLID) that identifies the port where the fabric is to deliver the packet. Switches, such as the switch 504, also each have a number of ports. Each port on the switch 504 can be associated with a port on the end node 502. For instance, the port 518 of the switch 504 is associated with the port 516 of the end node 502, as indicated by the arrow 520. Data packets received by the switch 504 that are intended for the port 516 of the node 502 are thus sent to the port 516 from the port 518. More particularly, when the switch 504 receives a packet having a DLID, the switch only checks that the DLID is non-zero. Otherwise, the switch routes the packet according to tables programmed by the SM.

Besides DLIDs that each identify specific ports within an Infiniband subnet, multicast DLIDs, or multicast addresses, may also be specified. In general, a set of end nodes may join a multicast group, such that the SM assigns a port of each node with a multicast DLID of the multicast group. A data packet sent to the multicast DLID is sent to each node that has joined the multicast group. Each switch, such as the switch 504, has a default primary multicast port and a default non-primary multicast port.

When a data packet that has a multicast DLID is received, the multicast DLID is examined, and the data packet is forwarded, based on the tables programmed by the SM. If the multicast DLID is not in the table, or the switch does not maintain tables, that it forwards the packets on the primary and non-primary default multicast ports. In such a case if the multicast packet is received on the primary multicast port then the packet is sent out on the non-primary multicast port; otherwise the packet is sent out on the primary multicast port. Data packets received by the switch 504 that specify the multicast DLID are thus sent from one of these multicast ports to the associated ports of the multicast group nodes. The switch 504 can be configured with routing information for the multicast traffic that specifies the ports where the packet should travel.

Furthermore, although any Infiniband node can transmit to any multicast group, data packets are not guaranteed to be received by the group members correctly if the switches, such as the switch 504, do not forward the packets correctly. Therefore, the switches should be set up so that multicast data packets are received by the group members. This can be accomplished by ensuring that multicast data packets are always funneled through a particular one or more switches that are preprogrammed, or proprietarily programmed, to ensure that multicast packets reach their proper destinations. In general, when a node joins the multicast group, by sending a request to the SM, the SM programs the switches so that the packets are routed to all the members of the group correctly.

In FIG. 6, a more complex Infiniband network 600 is shown that has two subnets 602 and 604. The subnet 602 has end nodes 604, 606, and 608, which are variously connected to switches 610 and 612. Similarly, the subnet 604 has end nodes 614, 616, 618, and 20, which are variously connected to switches 622 and 624. The switches 610 and 612 of the subnet 602 are variously connected to the switches 622 and 624 of the subnet 604 through the routers 626 and 628, which enable inter-subnet communication. In this context, variously connected means that one or more ports of one entity are associated with one or more ports of another entity. For example, the node 604 may have two ports, one associated with the switch 610, and another associated with the switch 612.

Path Rerouting for Network Node Failover

Figure 7:
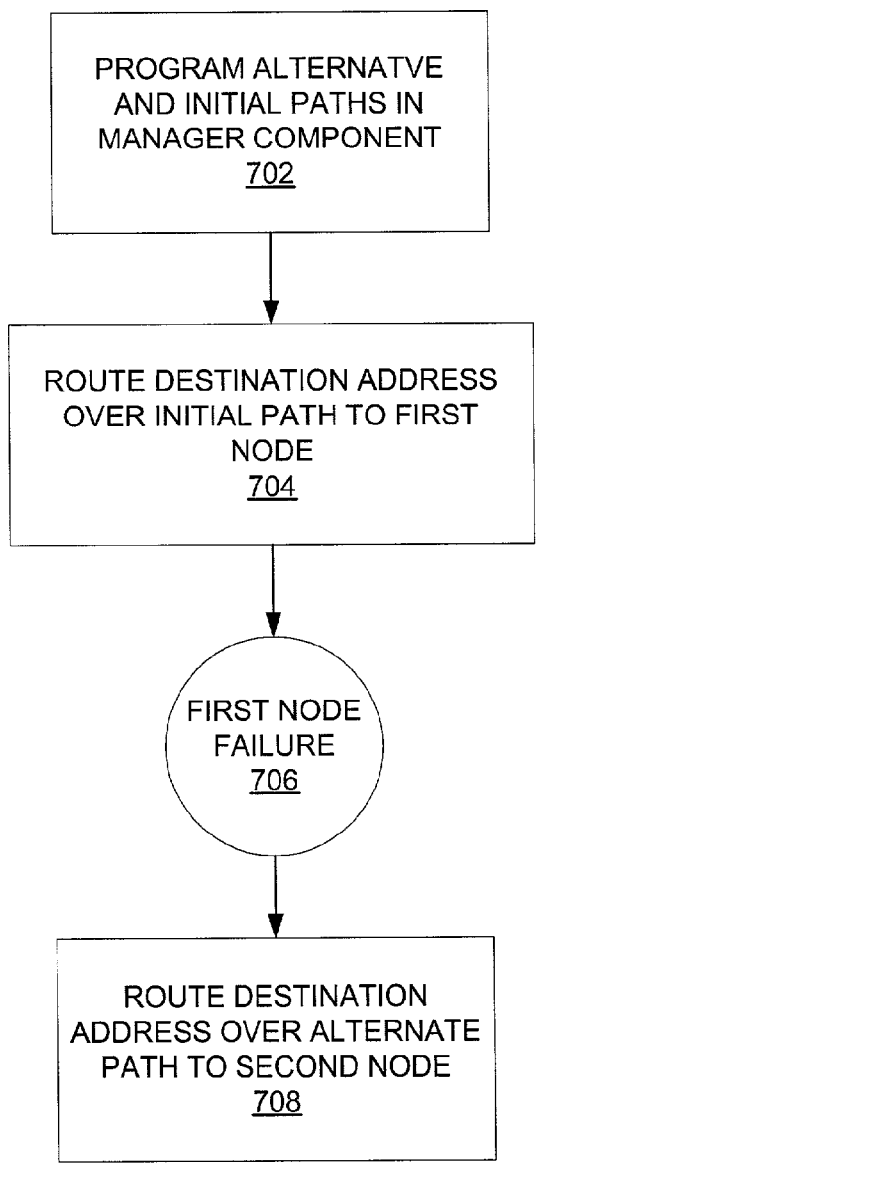
FIG. 7 is a flowchart of a method showing how one embodiment achieves network node failover, by rerouting a destination address along an alternate path.

Embodiments of the invention can achieve network node failover by destination address path rerouting. FIG. 7 shows a method 700 according to such an embodiment. An initial path to a first node and an alternate path to a second node are programmed in the manager component (702), which may be a subnet manager (SM). There may be additional alternate paths besides that to the second node. A destination address, such as a location identifier (LID) is routed over the initial path to the first node (704). This is accomplished by programming all of the switches along the paths by the manager component. Communication to the destination address thus travels over this path to reach the first node.

The first node then fails (706). In response, the manager component reroutes the destination address over the alternate path to the second node (708). The component that detects the failure of the first node may, for instance, send a proprietary message to the manager component to accomplish this rerouting. Alternatively, the manager component may itself detect the failure of the first node. Rerouting can be accomplished by reprogramming all of the switches along the paths by the manager component. Communication to the destination address thus now travels over this path to reach the second node. In this way, the second node takes over from the first node.

Therefore, in this embodiment of the invention, the manager component, such as an SM, is kept primed with alternate routes for backup and unused host channel adapters (HCAs) and ports. When a failure is detected, the SM is nudged, such as by using a proprietary message to the SM, so that it immediately assigns the LIDs to the backup adapters or ports, and correspondingly reprograms switches in its subnet. This is accomplished quickly, since the alternate routes are already preprogrammed in the SM, and the number of switches to be reprogrammed can be kept to a minimum number, and even down to a single switch.

Figure 8:
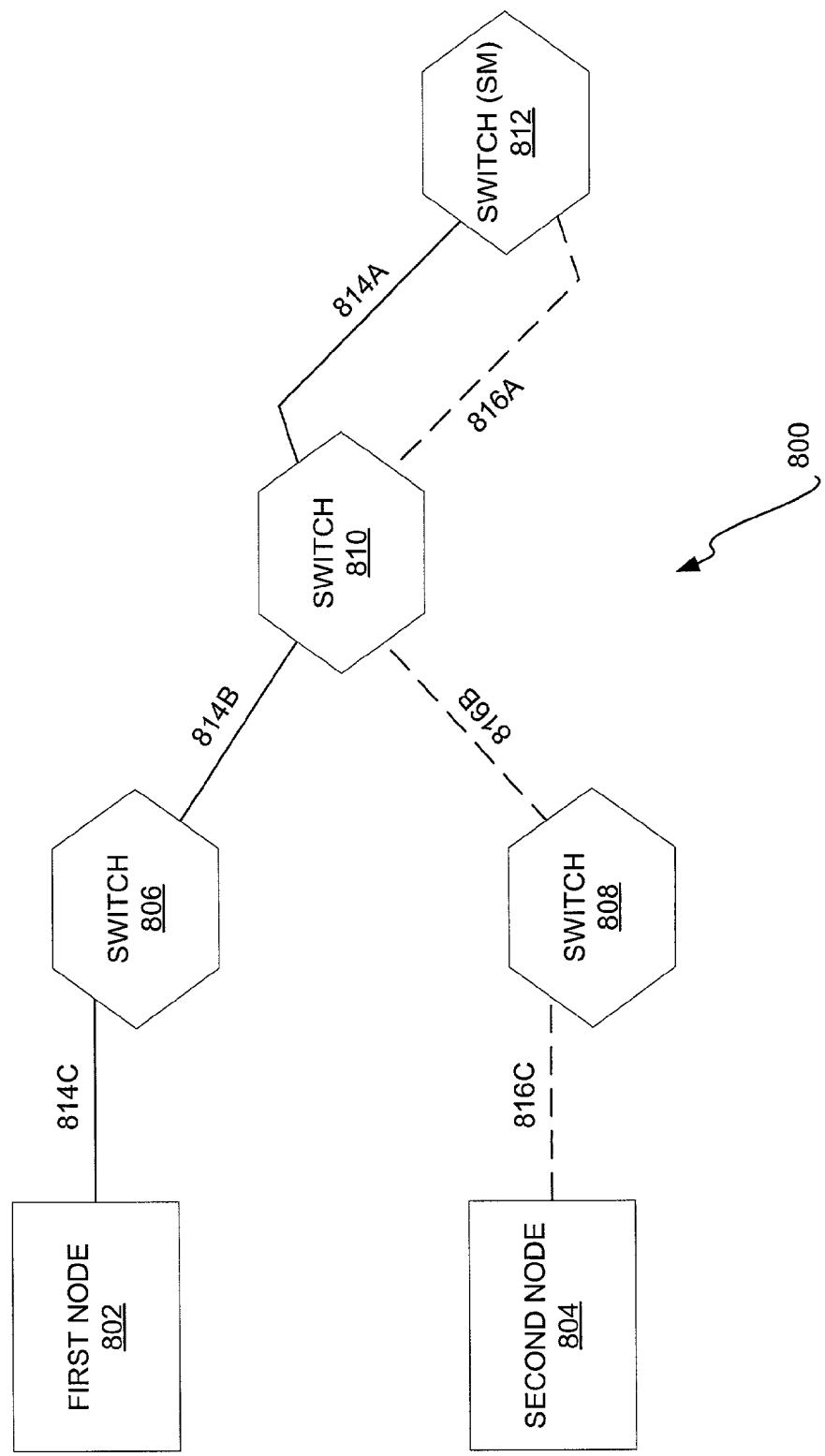
FIG. 8 is a diagram of a system showing diagrammatically the performance of the embodiment of FIG. 7.

FIG. 8 shows this embodiment of the invention diagrammatically as the system 800. The system 800 includes a first node 802, a second node 804, and switches 806, 808, 810, and 812. The switch 812 also serves as the SM in this case. That is, the logic implementing the SM is located in the switch 812. The SM has programmed two paths. A first path travels from the switch 812 to the switch 810, as indicated by the solid segment 814A, then to the switch 806, as indicated by the solid segment 814B, and finally to the first node 802, as indicated by the solid segment 814C. A second path travels from the switch 812 to the switch 810, as indicated by the dotted segment 816A, then to the switch 808, as indicated by the dotted segment 816B, and finally to the second node 804, as indicated by the dotted segment 816C.

Initially the SM routes data packets addressed to the destination address over the first path to the first node 802, such that the switches 806, 808, 810, and 812 are correspondingly programmed. However, should the first node 802 fail, the SM reroutes packets addressed to the destination address over the second path to the second node 804, where the switches 806, 808, 810, and 812 are correspondingly reprogrammed. That is, the switches 806, 808, 810, and 812 are reprogrammed so that packets addressed to the destination address travel over the second path to reach the second node 804, instead of over the first path to reach the first node 802.

Switch Port Remapping for Network Node Failover

Figure 9:
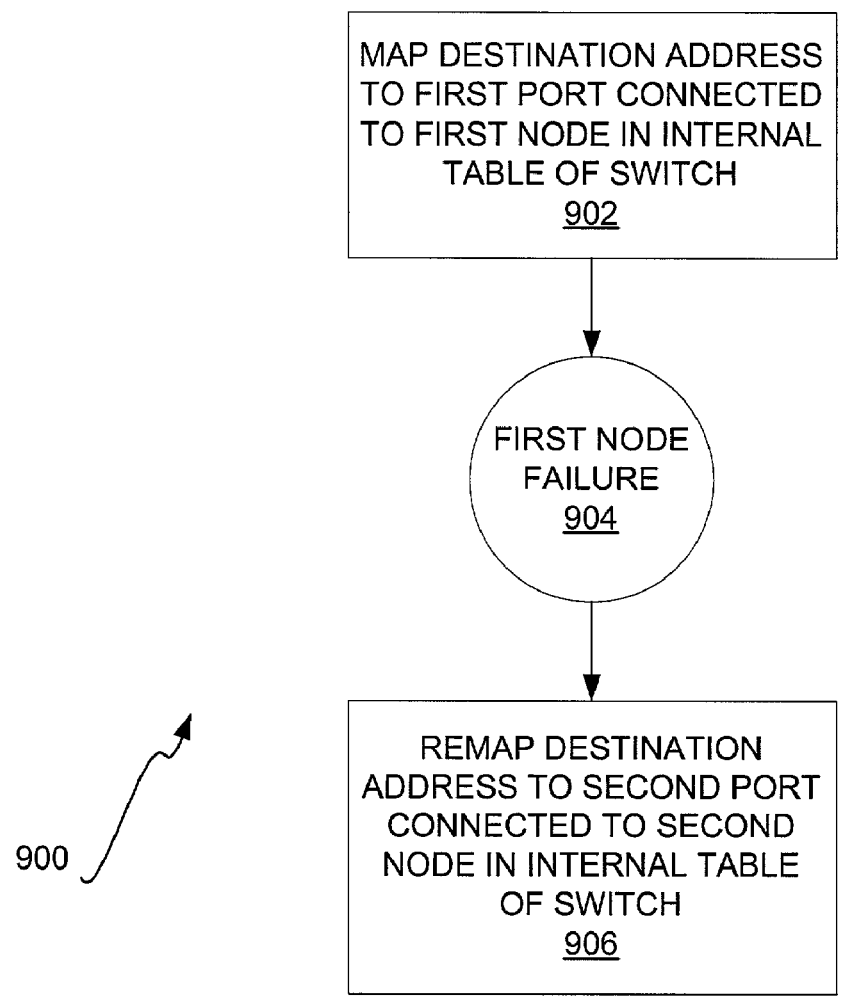
FIG. 9 is a flowchart of a method showing how another embodiment achieves network node failover, by remapping a destination address to a different switch port.

Embodiments of the invention can also achieve network node failover by switch port remapping. FIG. 9 shows a method 900 according to such an embodiment. A destination address, such as a location identifier (LID), is initially mapped to a first port of a switch that is connected to a first node (902). The destination address-to-first port mapping is performed internally in the switch, in an internal table of the switch maintained for these purposes. Communication to the destination address that reaches the switch is thus routed to the first port, such that it arrives at the first node.

The first node then fails (904). In response, the switch remaps the destination address to a second port that is connected to a second node. This is again performed internally in the switch, in the internal table of the switch. Communication to the destination address that reaches the switch is now routed to the second port, such that it arrives at the second node. This remapping, or reprogramming, by the switch may be according to a proprietary manner. The second, alternate port may be a standby port, or a proprietary channel adapter (CA) that accepts failed-over LIDs. Alternatively, the switch may change the destination LID (DLID) in the data packets received so that they are accepted by the receiving host CA (HCA).

Figure 10:
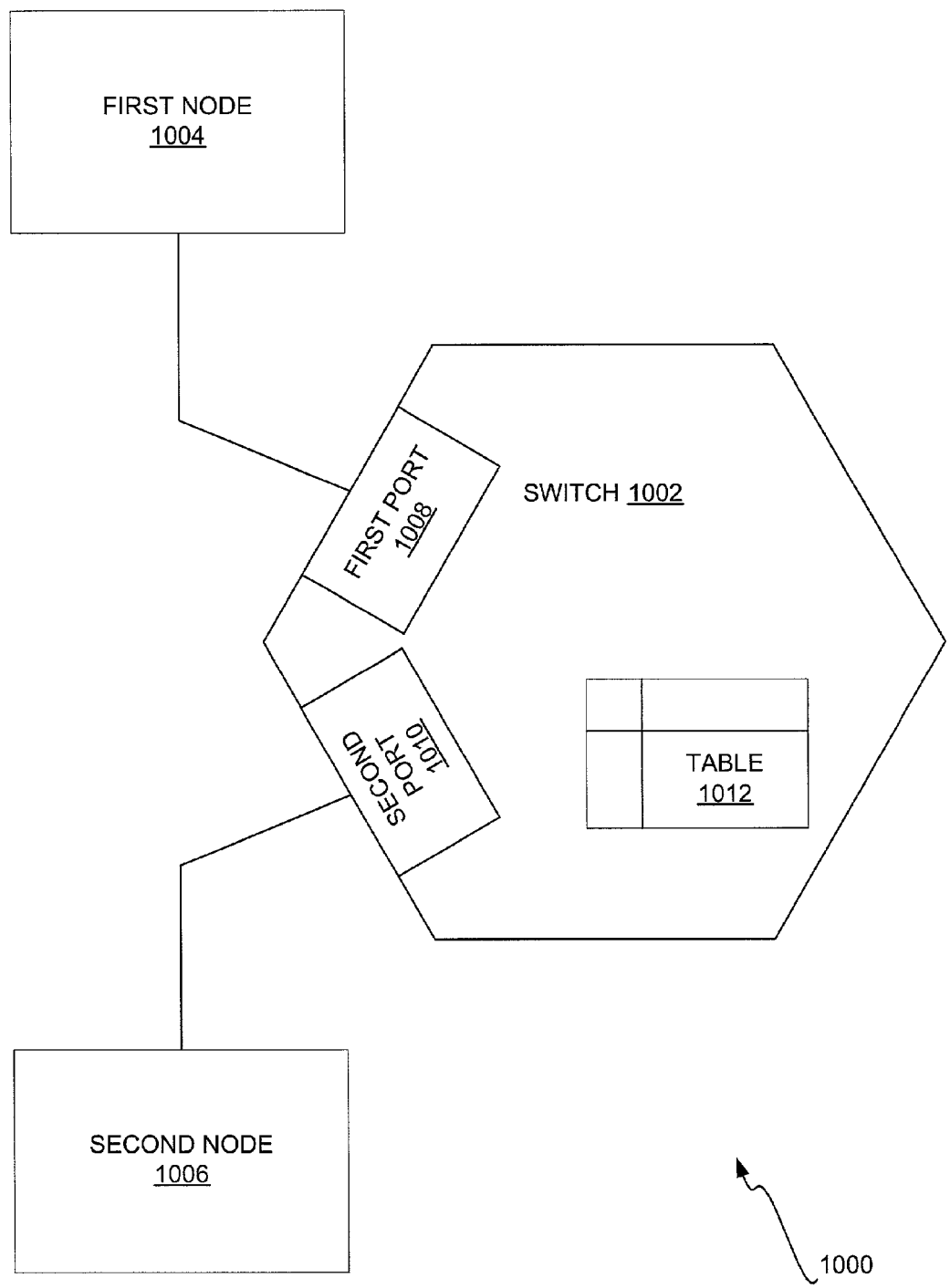
FIG. 10 is a diagram of a system showing diagrammatically the performance of the embodiment of FIG. 9.

FIG. 10 shows this embodiment of the invention diagrammatically as the system 1000. The system 1000 includes a switch 1002, a first node 1004, and a second node 1006. The switch 1002 has a first port 1008 and a second port 1010, and maintains a table 1012 in which destination addresses are mapped to ports. The switch 1002 is initially programmed so that a given destination address is mapped to the first port 1008, such that data packets having this address are routed by the switch 1002 to the first node 1004. Upon failure of the first node 1004, however, the switch 1002 reprograms itself so that the destination address is remapped to the second port 1010, such that data packets having this address are now routed by the switch 1002 to the second node 1006.

Switch with Hidden Ports for Expanded Port Range to Ease Port Remapping

To ease the port remapping as described in the embodiment of FIGS. 9 and 10, an inventive switch may be used in one embodiment that has hidden output ports and only a single visible output port, so that the assigning manager assigns an expanded port range to the switch. The assigning manager may be a subnet manager (SM), and the port range may be the location identifier (LID) mask count (LMC).

The SM assigns an LMC to a port based on the number of paths to the port. The port masks the LID with the LMC to determine if the packet is meant for it, but the switches look at all the bits. In this way a packet meant for the same destination port may be routed over different paths by using different LID values, so long as the resultant LID under the LMC mask is the same. The inventive switch has a substantially equal number of input and output ports, however, but hides all of the output ports except for a small number of output ports, such as a single output port. The assigning SM is thus fooled into providing an expanded LMC range than it otherwise would. The expanded LMC range allows the inventive switch to more easily remap a destination address to a new port when one of the network nodes has failed.

Figure 11:
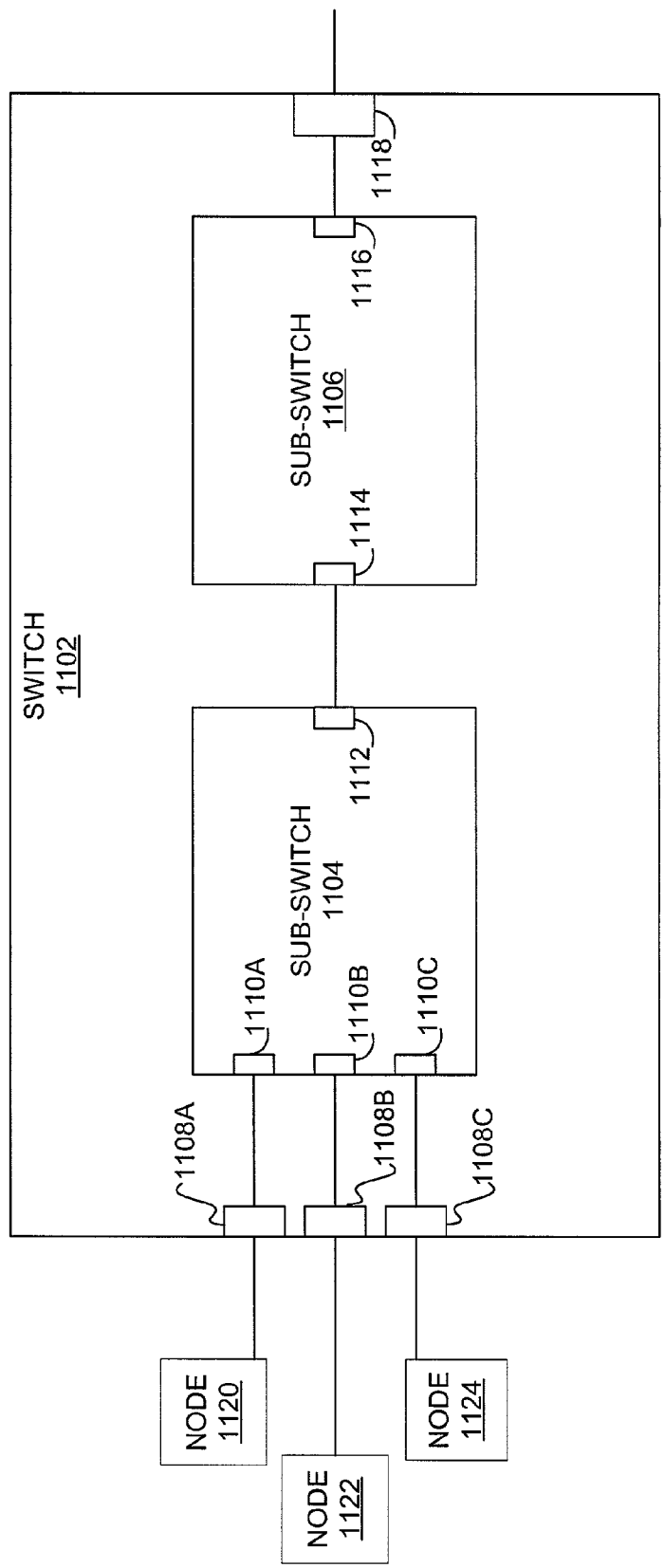
FIG. 11 is a diagram of a system including an inventive switch having hidden output ports so that an assigning manager component assigns an expanded port range to the switch, according to one embodiment of the invention.

FIG. 11 shows an embodiment of such an inventive switch 1102 as part of a system 1100. The switch 1102 is made up of two sub-switches 1104 and 1106. The switch 1102 has ports 1108A, 1108B, and 1108C that connect to the nodes 1120, 1122, and 1124, respectively. The ports 1108A, 1108B, and 1108C correspond to the ports 1110A, 1110B, and 1110C of the sub-switch 1104. The port 1112 is connected to the port 1114 on the switch 1106. The switch 1106 has one port 1116 to which the port 1118 of the switch 1102 corresponds. The port 1112 appears as a channel adapter (CA) port to the SM. The switch 1106 makes it appear as if there are multiple paths between its port 1116 and the port 1114 linking to the port 1112. As a result, the SM assigns an expanded LMC range to the port 1112 of sub-switch 1104.

Thus, although as a product the switch 1102 is a single device, such as with one input link, or port, on the fabric side and three output links, or ports, on the host side, the SM sees the internal structure of the switch. Therefore, in actuality the SM views the switch 1102 as the sub-switches 1104 and 1106 with multiple links, or ports, and a channel adapter (CA). Beyond the CA, the switch 1202 is not visible to the SM. Furthermore, it is noted that the switch 1102 as shown in FIG. 11 is an example of such a switch, such that the invention itself is not limited to the particular implementation of FIG. 11.

The sub-switch 1104 has the intelligence to field the correct set of management queries and pass regular data to its ports 1110A, 1110B, and 1110C, based on its internal mappings to these ports. The sub-switch 1104 further assigns the destination addresses to the ports on nodes 1120, 1122 and 1124 and manages them as well. As noted above the fabric's SM assigns an expanded LMC range to the port 1112. This facilitates port remapping when one of the nodes 1120, 1122, and 1124 fails, causing another of these nodes to take over from the failed node The packets destined for the LIDs assigned to the ports 1120, 1122, 1124 continue to be received at the port 1112, since the SM and the rest of the fabric view it is a CA. The specialized switch 1202 then collects the packets and forwards them to the nodes 1120, 1122 or 1124 as appropriate. If any of the ports fails, the SM in the sub-switch 1104 reconfigures the mappings to reroute the packets correctly. The fabric-wide SM is not aware of the existence of these ports or the nodes. Furthermore, it is not aware of and not affected by the failure, failover, or recovery of any of these ports or the nodes. However, the fabric-wide SM still assigns the destination addresses and controls the paths, service levels, partitioning or zoning, and other fabric control-level functions for these ports and nodes. The LIDs used by the nodes 1120, 1122, and 1124 are thus assigned by the SM controlling the entire Infiniband fabric An LMC range and LIDs are thus assigned to all the ports of the nodes 1120, 1122, and 1124 by the inventive switch. The routing to the ports is seamlessly integrated with the fabric SM since it routes to the port 1112. The SM on the inventive switch can divide up the LMC range, and hence the LIDs, among the ports on the nodes. On failover, the path bits may be modified to include the failover LID in a given port's range, thereby moving the LID to the port. Although such a solution may be implemented directly in a proprietary SM, the embodiment of FIG. 11 achieves this solution without using such a proprietary SM, by effectively erecting a firewall between the fabric of the switch 1102 and the Infiniband fabric of which the switch 1102 is a part. Furthermore, some of the hidden ports may be kept unused, to each act as a hot standby port for those that are being actively used. The failure of the active ports, as well as the failover to the unused ports, will then be hidden from the rest of the Infiniband fabric.

The embodiment of FIG. 11 can be configured so that each port in a relevant subset is assigned the same LMC range, and selects a particular LID to use as its source LID. This configuration allows packets to be sent from any of the nodes 1120, 1122, and 1124. Since the routing is path bits based, the flow is routed correctly, while the source LIDs, which are reflected as the destination LIDs by a replying node, are routed to the port to which the application using it is assigned. Furthermore, if it is desired to use the same source LID, this may be done by having the routing matrix of the switch 1102 modified to a desired port. Finally, the embodiment of FIG. 11 can also be used to have the switch 1102 rewrite the destination LID based on the new destination LID after a failure has occurred. The receiver can be a hot standby port, or a port that is already being used.

Figure 12:
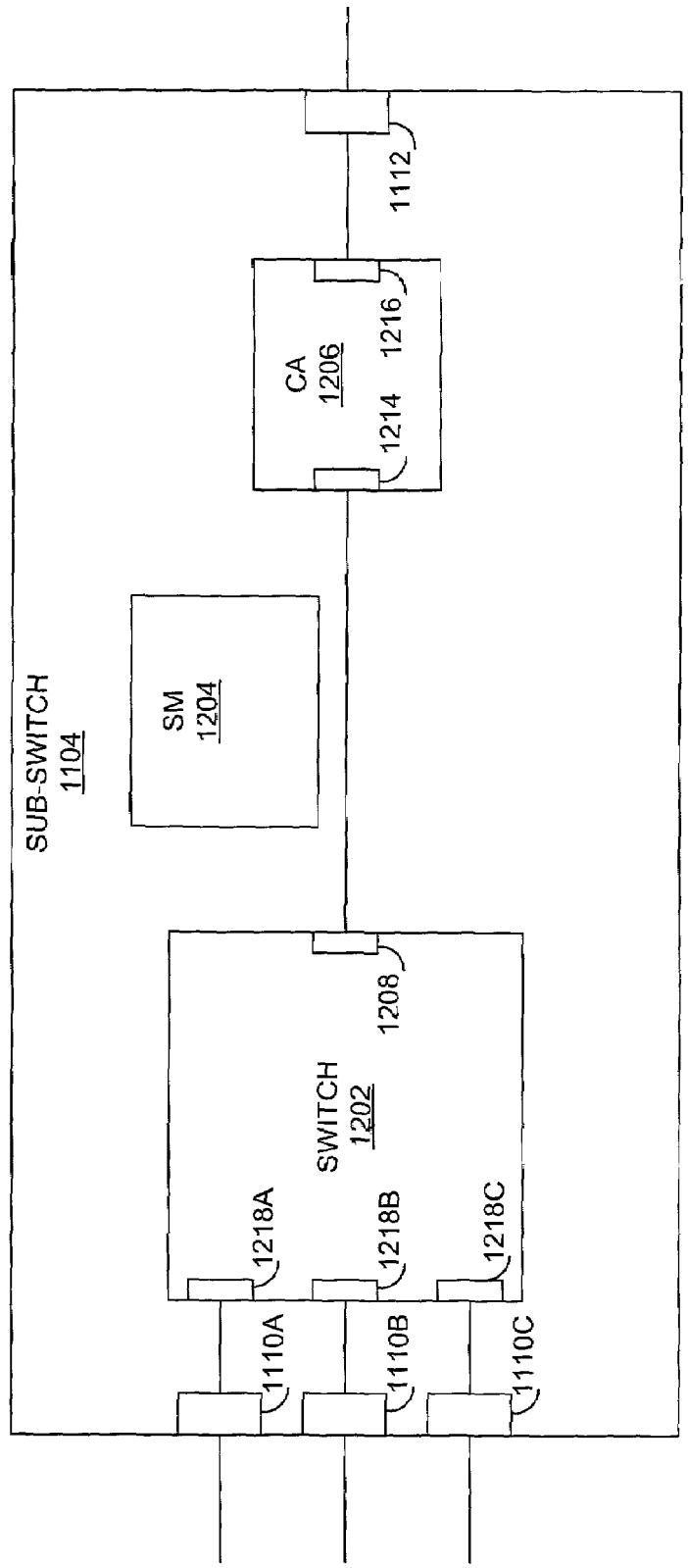
FIGS. 12 and 13 are diagrams showing how particular embodiments of the invention can implement the sub-switches of the switch of FIG. 11.

FIG. 12 shows one embodiment of an implementation of the sub-switch 1104 of the switch 1102 of FIG. 11, where the sub-switch 1104 is made up of discrete Infiniband components. Specifically, the sub-switch 1104 is made up of a constituent switch 1202, a constituent SM 1204, and a constituent channel adapter (CA) 1206. The switch 1202 has ports 1218A, 1218B, and 1218C corresponding to the ports 1110A, 1110B, and 1110C of the sub-switch 1104. The switch 1202 also has port 1208 that connects to port 1214 of the CA 1206. Finally, the CA 1206 has port 1216 that corresponds to the port 1112 of the sub-switch 1104. The CA 1206 is specifically allocated the expanded LMC range by the assigning SM, which is not the SM 1204. The SM 1204 is the SM that controls the routing on the switch 1202 and also handles any management packets that may be received on the CA 1206 from the rest of the fabric. Data packets received by the CA 1206 are forwarded onto the switch 1202, and it correctly forwards them to the nodes 1120, 1122, and 1124 of FIG. 11 (not specifically shown in FIG. 12).

Figure 13:
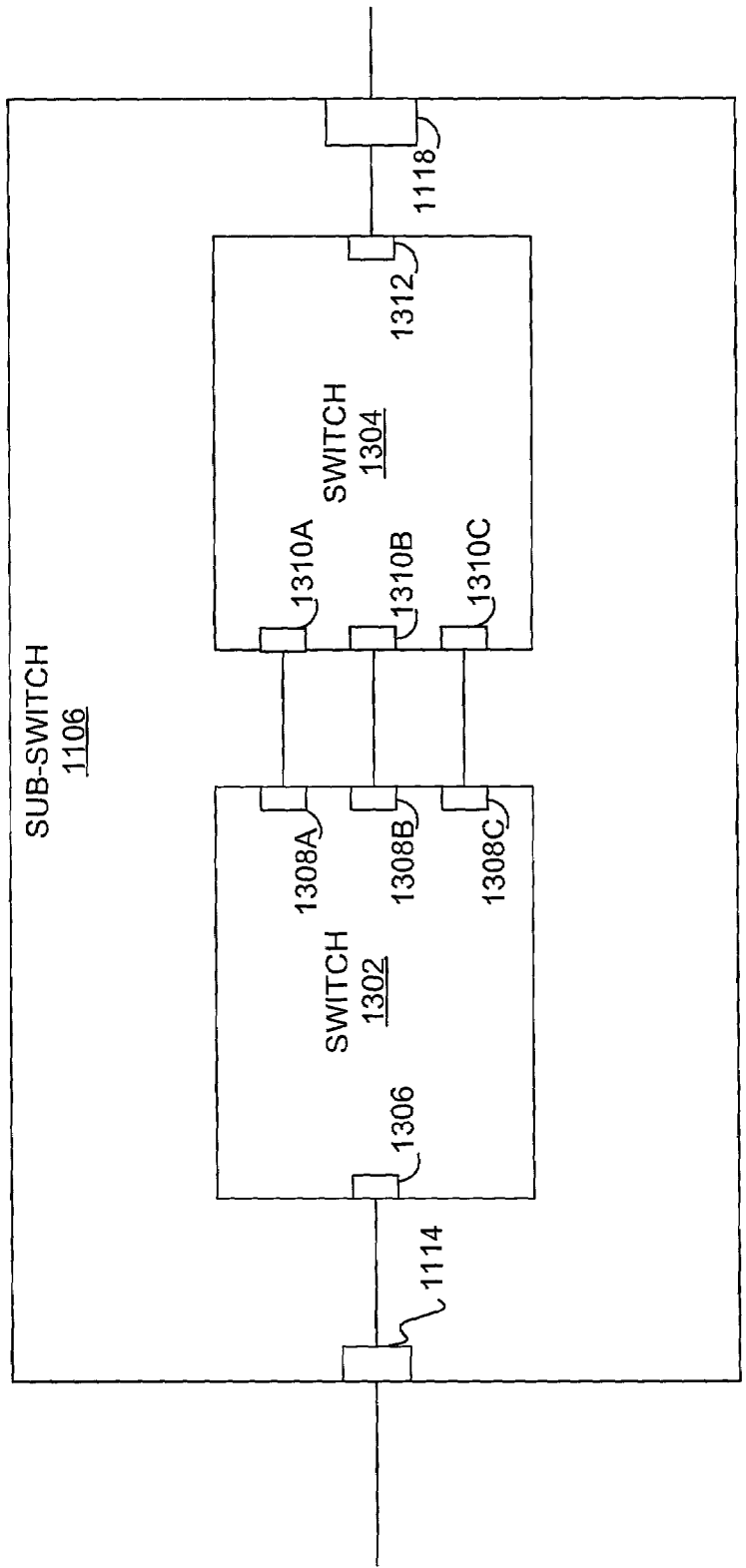

FIG. 13 shows one embodiment of an implementation of the sub-switch 1106 of the switch 1102 of FIG. 11, where the sub-switch 1106 is made up of discrete Infiniband components. The embodiment of FIG. 13 can particularly be used in conjunction with the embodiment of FIG. 12. The sub-switch 1106 is made up of a constituent switch 1302 cascaded together with a constituent switch 1304. The port 1114 of the sub-switch 1106 corresponds to the port 1306 of the switch 1302, whereas the port 1118 of the sub-switch 1106 corresponds to the port 1312 of the switch 1304. Further, the switch 1302 has ports 1308A, 1308B, and 1308C that lead to ports 1310A, 1310B, and 1310C of the switch 1304. These output ports and input ports thus provide multiple paths to the CA 1206 of FIG. 12 (not specifically shown in FIG. 13).

Advantages Over the Prior Art

Embodiments of the invention allow for advantages over the prior art. In particular, node failover is achieved by embodiments of the invention. Failover of a failed node does not require involvement of the remote node with which the failed node had been communicating. Rather, the takeover node assumes the responsibilities of the fail node transparently, and typically without knowledge of the remote node. Any host can preferably take over the responsibilities of a failed host. Embodiments of the invention are also applicable to all Infiniband transport types. Furthermore, in the embodiment where a switch is used that has hidden output ports to receive an expanded port range, port remapping is eased as compared to the prior art. In this embodiment, port failures are also hidden from the subnet manager (SM). This isolation helps avoid topology sweeps that the SM may conduct, which may otherwise unassign any location identifiers (LIDs) and decommission any multicast groupings.

Alternative Embodiments

It will be appreciated that, although specific embodiments of the invention have been described herein for purposes of illustration, various modifications may be made without departing from the spirit and scope of the invention. For example, where the invention has been largely described in relation to Infiniband networks, the invention is applicable to other types of networks as well. As another example, the implementation of an inventive switch as shown in FIGS. 12 and 13 can be designed differently than that shown. That is, the invention is not limited to the embodiment of FIGS. 12 and 13. Accordingly, the scope of protection of this invention is limited only by the following claims and their equivalents.

I claim:

1. A system comprising at least one of:
   a manager component of a network having programmed therein alternate routes for a destination address, such that upon failure of a first node of the network to which the destination address is initially routed, the manager component selects one of the alternate routes to route the destination address to a second node of the network;
   a first switch of the network having a port for each of at least a third and a fourth node of the network, such that upon failure of the third node, the first switch remaps a destination address initially mapped to the port for the third node to the port for the fourth node;
   a second switch of the network having an input port for each of at least a fifth and a sixth node of the network, and a visible output port and one or more other output ports to receive an expanded port range from an assigning manager component, such that upon failure of fifth node, the second switch uses the expanded port range to remap a destination address initially mapped to the input port for the fifth node to the input port for the sixth node; and wherein the expanded port range comprises an expanded location identifier (LID) mask count (LMC) range.

2. The system of claim 1, wherein the alternate routes travel through the network via one or more switches.

3. The system of claim 1, wherein the first switch maintains one or more internal tables in which the destination address initially mapped to the port for the third node and remapped to the port for the fourth node upon failure of the third node is stored.

4. The system of claim 1, wherein the second switch maintains one or more internal tables in which the destination address initially mapped to the input port for the fifth node and remapped to the input port for the sixth node is stored.

5. The system of claim 1, wherein the first switch comprises a first sub-switch and a second sub-switch.

6. The system of claim 1, wherein the second switch comprises a first sub-switch and a second sub-switch.

7. The system of claim 1, wherein the manager component and the assigning manager component each comprises a subnet manager (SM).

8. The system of claim 1, wherein the destination address initially routed to the first node, the destination address initially mapped to the port for the third node, and the destination address initially mapped to the port for the fifth node, each comprise a location identifier (LID).

9. The system of claim 1, wherein each of the first, the second, the third, the fourth, the fifth, and the sixth nodes comprises a channel adapter (CA).

10. A method comprising:
    routing a destination address over an initial path to a first node connected to a first port on a switch, the destination address initially mapped to the first port on the switch; and,
    upon failure of the first node, performing an action for a second node to failover for the first node selected from the group essentially consisting of:

routing the destination address over an alternate path to the second node selected by a manager component;

remapping the destination address from the first port on the switch to a second port on the switch connected to the second node; receiving by the switch of an expanded port range from an assigning manager component due to the switch having one or more hidden output ports in addition to a visible output port; and wherein the expanded port range comprises an expanded location identifier (LID) mask count (LMC) range.

11. The method of claim 10, further initially comprising programming the alternate path in the manager component.

12. The method of claim 10, further comprising maintaining one or more internal tables by the switch in which the destination address is initially mapped to the first port on the switch.

13. The method of claim 10, wherein remapping the destination address comprises remapping the destination address internally by the switch.

* * * * *